United States Patent [19]

Ernst

[11] 4,207,540
[45] Jun. 10, 1980

[54] GAS LASER SYSTEM

[75] Inventor: Gerardus J. Ernst, Wilgenkamp, Netherlands

[73] Assignee: Stichting Voor Fundamenteel Onderzoek der Materie, Utrecht, Netherlands

[21] Appl. No.: 876,498

[22] Filed: Feb. 9, 1978

[30] Foreign Application Priority Data

Feb. 10, 1977 [NL] Netherlands ..................... 7701389

[51] Int. Cl.² ............................................. H01S 3/097
[52] U.S. Cl. ............................................ 331/94.5 PE
[58] Field of Search ................. 331/94.5 G, 94.5 PE, 331/94.5 D

[56] References Cited

U.S. PATENT DOCUMENTS

| 4,112,392 | 9/1978 | Andersson et al. | .......... 331/94.5 PE |
| 4,114,113 | 9/1978 | Hasson et al. | ................. 331/94.5 G |
| 4,135,167 | 1/1979 | Godard | ......................... 331/94.5 PE |

OTHER PUBLICATIONS

G. Otis, "High Trigger Current Structure for Double-Discharge TEA Lasers", *The Review of Scientific Instruments,* vol. 43, No. 11, Nov. 1972, pp. 1621-1623.
C. L. Sam, "Small-size Discharge-capacitor $N_2$ Laser", *Applied Physics Letters,* vol. 29, No. 8, pp. 505-506, 15 Oct. 1976.

*Primary Examiner*—James W. Davie
*Attorney, Agent, or Firm*—Leydig, Voit, Osann, Mayer & Holt

[57] ABSTRACT

A gas laser system having a laser tube with two parallel rectangular flat electrodes, and a metal plate positioned between the parallel edges of the electrodes coupled to an electronic circuit for inducing the ionization of the gas in the gas laser tube preceding the discharge of the gas.

6 Claims, 3 Drawing Figures

GAS LASER SYSTEM

The invention relates to a gas laser system comprising a laser tube with two rectangular substantially flat electrodes being positioned opposite each other and parallel to the axis of the tube for producing a substantially uniform field, a direct current source with a buffer capacitor one of the two terminals of which is connected to the first of said electrodes, and a means for inducing the ionization of the gas preceding the discharge in the gas mixture.

Such a system is known. With this known system a corona discharge is applied as means for producing ultra-violet radiation causing the ionization of the gas. For that purpose this system has thin metal spray wires, so-called trigger wires, provided in the plane centrally between and parallel to the electrodes, said wires being electrically connected to the positive electrode by means of a capacitor as an energy limiting means to prevent field discharge in consequence of the high field intensity in the environment of these wires.

The invention aims to provide a more simple ionization means requiring little energy and still giving a better ultra-violet production.

For that purpose the invention is characterized in that said means comprises at least one metal plate connected to the other terminal of the current source and being insulated at the side of the discharge and being positioned in parallel to the axis between parallel running edges of the electrodes, a series connection of an impedance and a self induction element, or inductor, mutually connecting the electrodes, a switch which may temporarily connect the junction of the impedance and the inductor to the plate, and a capacitor between the second electrode and the plate.

It has appeared that by applying the invention the laser tube provides a very stable and very homogeneous discharge. An explanation of this might be that the invention leads to a very regular production of ultra-violet radiation, causing a radiation which is very regularly distributed in space in particular in the direct environment of the electrodes.

In an embodiment of the invention this is further sustained by applying as electrode profiles high polished uniform field electrode profiles, by means of which the ultra-violet production substantially only will take place along the surface of the insulation of the metal plate. It has appeared that a glass plate is very suitable as insulation of the plate.

Now the invention will be further explained by means of the drawing comprising three Figures.

FIG. 1 schematically shows the principle on which the invention is based.

In the Figures, corresponding elements are indicated by corresponding reference numbers.

Figure 1:
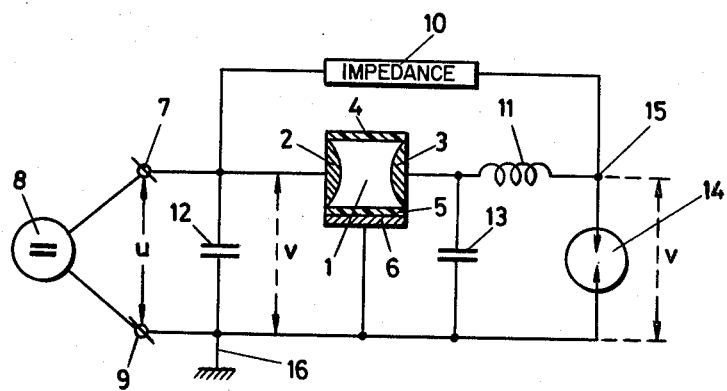

FIG. 1 shows a cross-sectional view of a gas laser tube 1, comprising a first metal electrode 2 and a second metal electrode 3, which electrodes 2, 3 form the side walls of the tube 1, a top plate 4 made of insulating material and a metal bottom plate 6 provided with an insulating layer 5. The electrode 2 is connected to the positive terminal 7 of a current source 8. The negative terminal 9 of the current source 8 is connected to the metal plate 6. A series-connection of two impedances 10 and 11 is provided between the electrodes 2 and 3, the last mentioned impedance 11 being always an inductor while it is not necessary that the first one 10 is an inductor too. The junction 15 of the inductors 10 and 11 can be connected to the metal plate 6 via a switch 14, the plate being connected to ground 16. The capacitors 12 and 13 are connect the electrodes to the plate 6.

The laser system operates as follows: By slowly increasing the voltage U to the terminals 7 and 9 of the current source 8, the electrode 2 is directly brought at a high potential in respect of the plate 6 and the electrode 3 via the inductors 10 and 11. Dependent on the adjustment of the spark gap 14 a discharge will take place over this spark gap 14, viz. when the potential is high enough, e.g. $+V$ volt. The junction 15 then becomes ground potential and the inductor 11 together with the capacitor 13 form an oscillating circuit. The inductor 10 is chosen such that it has a high impedance for the pulse raised by closing the spark gap 14, so that this closing substantially exerts no influence on the voltage $+V$ between the terminals of the capacitor 12 or the potential at the electrode 2, respectively. The potential at the electrode 3 then is determined by the oscillating circuit 11, 13 and will oscillate downwardly from the value $+V$ volt to 0 volt in a number of periods. During the first period of this downward oscillation the potential at the electrode 3 momentarily will reach nearly $-V$ volt and the field intensity in the tube will be exceptionally high. In consequence of the presence of the grounded plate 6 a corona discharge is formed then along the surface of the layer 5, by which ultra-violet radiation is produced which brings the laser gas into the necessary condition by cathodic photo-emission and/or by photo-ionization of organic impurities in the gas, after which the energy, being accumulated in the capacitors 12 and 13, can be dissipated in the tube 1.

Figure 2:
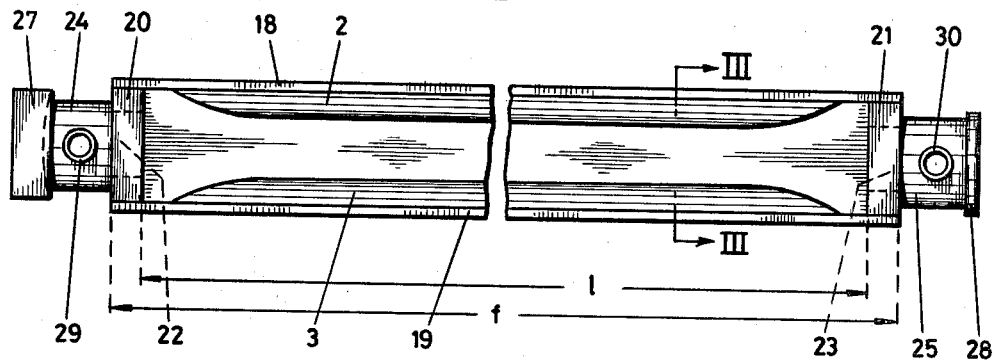
FIG. 2 shows a top view with portions removed of a more elaborated embodiment of a laser tube according to the invention.
Figure 3:
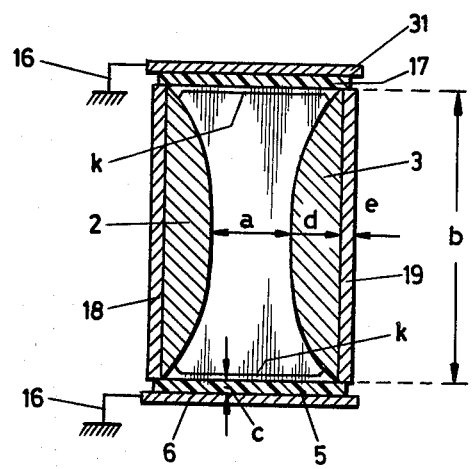
FIG. 3 shows a cross-sectional view of the tube according to the line III—III in FIG. 2.

FIG. 2 shows a top view of a gas laser tube 1 without insulating plate 17 and without second grounded metal plate 31 (see the section of it shown in FIG. 3). It has appeared that this tube 1, incorporated into an electric circuit as shown in FIG. 1, can operate free of disturbances with a gas mixture consisting of $CO_2$, $N_2$ and He in a ratio of volume of 1:1:3. For this purpose the current source 8 supplied a voltage of 34 kV and the buffer capacitors 12 and 13 together had a capacity of 0.041 $\mu F$, the inductor 11 having a size of approximately 50 nH.

FIG. 3 shows a cross-sectional view of the tube according to the line III—III in FIG. 2. The electrodes 2 and 3 consist of high polished brass and are shaped according to the publication by T. Y. Chang in the Review of Scientific Instruments, vol. 44, No. 4, pages 405–407, 1973, titled "Improved uniformfield electrode profiles for TEA laser high voltage application" with parameters $k=0.02$ and $v=.bg \cos(-k)$.

The thickness d of the profiles 2, 3 is 9 mm, the width $b=62$ mm and the length $l=30$ cm. The distance between the profiles $a=20$ mm and the thickness c of the glass insulating plates 5, $17=2$ mm. The thickness e of the walls 18, $19=4$ mm. These walls consist of brass and form one entirety with the profiles 2 and 3 respectively and have a length $f=38$ cm. To ensure the stiffness of the construction these plates are provided with glass end pieces 20, 21. These end pieces 20, 21 are provided with openings 22, 23 with a cross-section of 22 mm. The openings 22, 23 give entrance to the glass tubes 24, 25 to which at the one side a mirror 27 is connected which is vapour precipitated with gold and has a radius of curvature of 1,2 meter and to which at the other side a flat germanium window 28 is connected. The tubes 24, 25 are provided with connections 29, 30 for the supply and the drain of the laser gas.

In FIG. 3 there is indicated by k the location where the corona discharge produces the ultra-violet radiation.

I claim:

1. A gas laser system comprising a laser tube with two rectangular substantially flat electrodes positioned opposite one another and parallel to the axis of the tube for producing a substantially uniform field, a direct current source with a buffer capacitor connected in parallel therewith, one terminal of said current source being connected to the first of said electrodes, and means for inducing the ionization of the gas preceding the discharge in the gas mixture, said means comprising at least one metal plate connected to the other terminal of the source of current and being insulated at the side of the discharge and being positioned in parallel to the axis between parallel running edges of the electrodes, a series connection of an impedance and an inductor mutually connecting the electrodes, said inductor connectd to said second electrode, a switch which may temporarily connect the junction of the impedance and the inductor to the metal plate, and a capacitor connected between the second electrode and the metal plate.

2. A laser system according to claim 1 in which the electrode profiles are uniform field electrode profiles.

3. A laser system according to either of claim 1 or 2 in which the electrodes are polished.

4. A laser system according to either of claim 1 or 2 in which a glass plate is positioned on the metal plate as insulation.

5. A laser system according to either of claim 1 or 2 in which said switch is a spark gap.

6. A laser system according to either of claim 1 or 2 in which the value of the inductor is more than 50 nH.

* * * * *